(12) United States Patent
Dong et al.

(10) Patent No.: US 9,658,494 B2
(45) Date of Patent: May 23, 2017

(54) DISPLAY SUBSTRATE, MOTHER SUBSTRATE FOR DISPLAY SUBSTRATES AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Tingze Dong, Beijing (CN); Dongsheng Huang, Beijing (CN); Zhinan Zhang, Beijing (CN); Yujia Wang, Beijing (CN); Qian Zhang, Beijing (CN); Peiqiang Guan, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 188 days.

(21) Appl. No.: 14/549,089

(22) Filed: Nov. 20, 2014

(65) Prior Publication Data

US 2015/0378191 A1 Dec. 31, 2015

(30) Foreign Application Priority Data

Jun. 26, 2014 (CN) .......................... 2014 1 0298513

(51) Int. Cl.
*G02F 1/1337* (2006.01)
*G02F 1/1339* (2006.01)
*G02F 1/1333* (2006.01)

(52) U.S. Cl.
CPC ...... *G02F 1/133784* (2013.01); *G02F 1/1339* (2013.01); *G02F 1/133351* (2013.01); *G02F 2001/133388* (2013.01)

(58) Field of Classification Search
CPC ............... B23K 2203/50; B23K 26/40; G02F 1/133351; G02F 1/133512;
(Continued)

(56) References Cited

U.S. PATENT DOCUMENTS

2002/0054253 A1* 5/2002 Cho .................. G02F 1/133512
349/110
2009/0033853 A1 2/2009 Zenati et al.
(Continued)

FOREIGN PATENT DOCUMENTS

| CN | 101142515 A | 3/2008 |
|---|---|---|
| CN | 101211068 A | 7/2008 |
| CN | 102854663 A | 1/2013 |
| CN | 103499901 A | 1/2014 |
| JP | 1-138532 A | 5/1989 |

OTHER PUBLICATIONS

1st Office action issued in corresponding Chinese application No. 201410298513.5 dated Jun. 14, 2016.

*Primary Examiner* — Huyen Ngo
(74) *Attorney, Agent, or Firm* — Nath, Goldberg & Meyer; Joshua B. Goldberg

(57) ABSTRACT

The present invention provides a display substrate, a mother substrate for display substrates and a display device. The display substrate comprises a display area and a non-display area surrounding the display area, wherein an alignment layer is disposed in the display area and the non-display area. In the display substrate according to the present invention, by providing the same pattern of alignment layer in both of the non-display area and the display area of the display substrate, the Mura defect caused by the difference of surface roughness between the display area and the non-display area of the display substrate may be signifi- (Continued)

cantly reduced, and a large amount of small foreign matters gathered due to the rubbing between the rubbing cloth and metal residuals may also be significantly reduced. Therefore, the yield of production and the quality of products may be improved.

13 Claims, 3 Drawing Sheets

(58) Field of Classification Search
CPC ... G02F 1/133788; G02F 2001/133519; Y02P 40/57; B82Y 10/00; H01L 2924/00; H01L 2224/48247; G09G 3/3648
See application file for complete search history.

(56) References Cited

U.S. PATENT DOCUMENTS

| | | |
|---|---|---|
| 2009/0059149 A1 | 3/2009 | Maeda et al. |
| 2010/0020275 A1* | 1/2010 | Mima ............... G02F 1/133514 349/106 |
| 2011/0007233 A1* | 1/2011 | Matsui ................. G02F 1/1337 349/43 |
| 2015/0103298 A1* | 4/2015 | Lee ..................... G02F 1/13378 349/123 |
| 2015/0293410 A1* | 10/2015 | Noma ............... G02F 1/133711 349/128 |
| 2016/0109748 A1* | 4/2016 | Kim ................. G02F 1/133512 359/893 |

* cited by examiner

DISPLAY SUBSTRATE, MOTHER SUBSTRATE FOR DISPLAY SUBSTRATES AND DISPLAY DEVICE

FIELD OF THE INVENTION

The present invention relates to the field of display technology, and in particularly, relates to a display substrate, a mother substrate for display substrates and a display device.

BACKGROUND OF THE INVENTION

Liquid crystal display (LCD for short) device is the electronic product with the greatest developing potential in display field, and has the advantages of low driving voltage, low power consumption, light in weight, small in size, no radiated harmful rays, and the like.

The liquid crystal display relies on an anisotropic surface processing of substrate surface films (i.e., alignment layers) to obtain various arrangements of liquid crystal molecules, and the alignment of liquid crystal molecules is one of the key technologies in liquid crystal display. Generally, a rubbing process is used to form a pattern, which enables that the movement of the liquid crystal molecules is oriented, on a surface of a substrate which forms a liquid crystal cell, such that the liquid crystal molecules on the surface of the substrate form an arrangement in order with respect to the substrate. Therefore, the liquid crystal molecules exhibit an order in long-range at macro level, so as to realize the image display.

As shown in FIG. 1, in a conventional display substrate an alignment layer 3 is only disposed in a display area 1, but not disposed in a non-display area 2. Therefore, roughness of surface is different between the display area 1 and the non-display area 2. This difference of roughness of surface leads to the following problems: in a rubbing process, degrees of wear to rubbing cloth are different between the display area 1 and the non-display area 2, such that the conditions of rubbing cloth corresponding to respective areas are different. Therefore, when a rubbing cloth, which is in poor conditions due to a long time rubbing with the non-display area 2, is rubbing the display area 1, it will produce imprints, such that Mura defect such as surrounding blocks, V blocks, H blocks, and the like occurs on the display area 1. On the other hand, metal wirings, which are connected to external circuits, are further disposed on the non-display area 2. Therefore, there may be some metal residuals on the surface of non-display area 2 besides the metal wirings. The presence of the metal residuals results in that the rubbing cloth, which is used for the non-display area 2, has a relatively larger amount of the electrostatic charges and hence is easier to absorb small foreign matters. By comparing the colors and conditions of different rubbing cloth, it may confirm that the small foreign matters have fell into a display substrate, that is, it is possible to leave the foreign matters in the cell, and thus a defect of bright dot is occurred.

In practices, it has been confirmed that the Mura defect is a severe quality problem. The Mura defect severely affects image quality of a product and hence the pass rate of the electrical testing (ET) is low, resulting in serious wasting of materials and equipments in back-end and quality problems. Furthermore, the foreign matters in the cell lead to broken bright spots on the whole screen when the light is turned on, this also severely affects the product quality. These two defects are more evident in small size display substrates.

Accordingly, these two defects are the technical problems that need to be solved urgently in the field of display technology.

SUMMARY OF THE INVENTION

An objective of the present invention is to provide a display substrate, a mother substrate for display substrates and a display device to solve the above-mentioned technical problems existing in the prior art. The display substrate may effectively reduce the Mura defect and the defect of bright dot, so as to improve the display performance.

The technical solution according to the present invention is:

A display substrate comprises a display area and a non-display area surrounding the display area, wherein an alignment layer is disposed in both of an area corresponding to the display area and an area corresponding to the non-display area.

Preferably, a sealant is disposed in the non-display area, the alignment layer in the display area is separated from the sealant.

Preferably, the distance between the edge of the alignment layer in the display area and an edge, which is close to the display area, of the sealant is ranged from 40 µm to 60 µm.

Preferably, the display substrate is a colour filter substrate, the display area is divided into a plurality of sub-pixel areas, a black matrix is provided between the adjacent sub-pixel areas in the colour filter substrate, and the black matrix is also provided in a spacer area between the alignment layer in the display area and the sealant.

Preferably, the display substrate is an array substrate, a bonding pad used for connecting external circuits is disposed in an area corresponding to the non-display area on the array substrate, and the alignment layer in the non-display area is separated from the bonding pad.

Preferably, the alignment layer is formed by a printing plate transfer method or a spray printing method.

Preferably, the alignment layer is made of a polymer material.

The present invention also provides a mother substrate for display substrates, which includes a plurality of sub-substrates, wherein the sub-substrate is the above-mentioned display substrate.

Preferably, a cutting area is formed between the adjacent sub-substrates, and the alignment layer further extends to the cutting area.

The present invention also provides a display device includes the above-mentioned display substrate.

The beneficial effects of the present invention are: in the display substrate according to the present invention, by providing the same pattern of alignment layer in both of the non-display area and the display area of the display substrate, the Mura defect caused by the difference of surface roughness between the display area and the non-display area in the display substrate may be significantly reduced, and a large amount of small foreign matters gathered due to the rubbing between the rubbing cloth and metal residuals may also be significantly reduced. The purpose of reducing the foreign matter in the cell is achieved, and therefore the yield of production and the quality of products may be improved.

Figure 1:
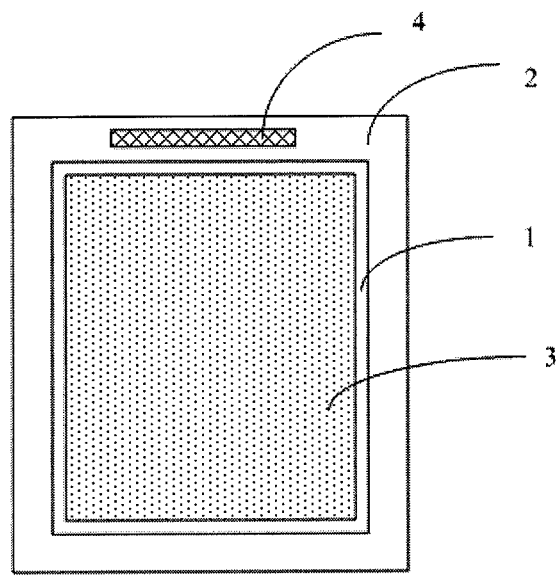
FIG. 1 is a schematic diagram showing a structure of a display substrate in the prior art.

REFERENCE NUMERALS 1. display area 2. non display area 3. alignment layer 4. bonding pad 5. sealant 6. cutting area

DETAILED DESCRIPTION OF THE EMBODIMENTS

In order to enable the person skilled in the art to better understand the technical solutions of the present invention, a display substrate, a mother substrate for display substrates and a display device will be described in more details in conjunction with the accompanying drawings and the specific embodiments.

The technical concepts of the present invention are base on the facts that Mura defect and bright dot defect arise, respectively: in a display substrate (including a colour filter substrate and/or an array substrate), the difference of coatings of alignment layers between a display area and a non-display area may cause the difference of surface roughness between the display area and the non-display area, so as to result in Mura defect. Further, in the array substrate, the metal wirings, which are corresponding to Thin Film Transistors (TFTs for short) in the display area, are disposed in a non-display area, so that electrostatic adhesion may occur between the metal wirings potential metal residuals and the rubbing cloth in the rubbing process, resulting in foreign matters in the cell and thus resulting in the defect of bright dot.

Embodiment 1

The present embodiment provides a display substrate, which includes a display area and a non-display area surrounding the display area, wherein alignment layers are disposed in both of an area corresponding to the display area and an area corresponding to the non-display area.

Figure 2:
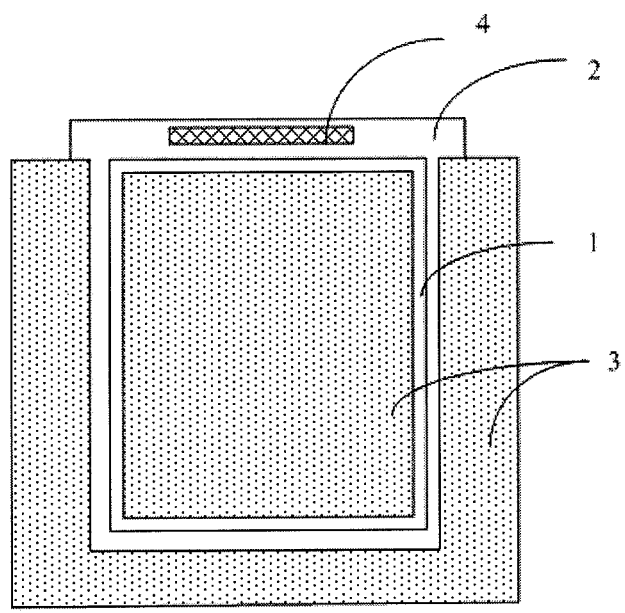
FIG. 2 is a schematic diagram showing a structure of a display substrate according to Embodiment 1 of the present invention.

In the present embodiment, the display substrate may include a colour filter substrate and/or an array substrate. As shown in FIG. 2, the display substrate is divided into a display area 1 and a non-display area 2 surrounding the display area 1. The alignment layer 3 is disposed in an area of the display area 1 corresponding to a colour filter substrate and/or an array substrate, wherein the alignment layer 3 in the colour filter substrate and/or the array substrate extends to an area corresponding to the non-display area 2. That is, the alignment layer 3 covers the display area 1 and the non-display area 2, so that the roughness of surface between the display area 1 and the non-display area 2 is the same.

That is in a display device including the display substrate according to the present embodiment, only the alignment layer 3 in the colour filter substrate extends to the area corresponding to the non-display area 2, so that the roughness of the surface of the colour filter substrate corresponding to the display area and the non-display area are the same, so as to avoid the Mura defect due to the difference of conditions of rubbing cloth in the rubbing process; alternatively, only the alignment layer 3 in the array substrate extend to the area corresponding to the non-display area 2, so that the roughness of the surface of the array substrate corresponding to the display area and the non-display area are the same, so as to avoid the Mura defect due to the difference of conditions of rubbing cloth in the rubbing process, and it can further avoid the foreign matters in the cell which is raised by the electrostatic adhesion of rubbing cloth, such that the defect of bright dot is eliminated or weakened; alternatively, the alignment layers 3 in both of the colour filter substrate and the array substrate extends to the area corresponding to the non-display area 2, so as to avoid Mura defect in both of the colour filter substrate and the array substrate, the defect of bright dot may be further eliminated or weakened in the array substrate. The improvement to the array substrate due to the extended disposing of the alignment layer is greater than that to the colour filter substrate.

Figure 4:
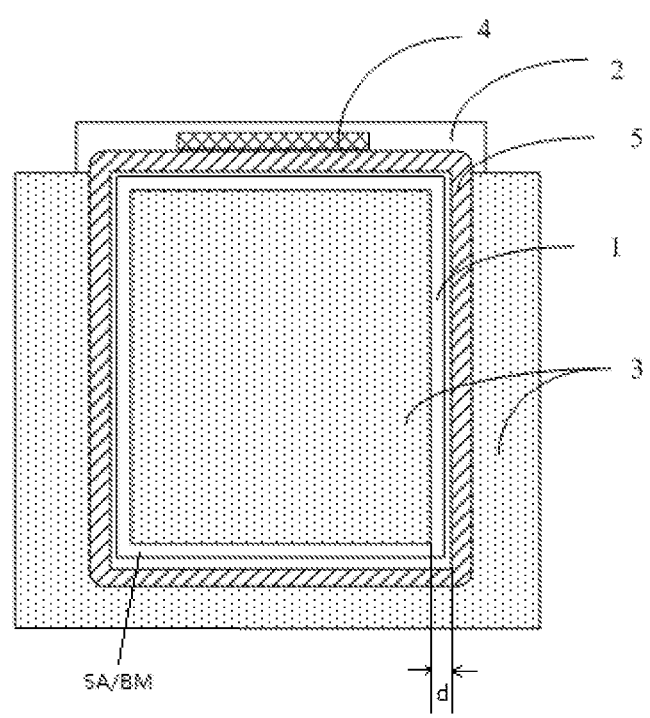
FIG. 4 is a schematic diagram showing a package structure of the display substrate in FIG. 2.

In the present embodiment, in order to realize a normal image display, that is in order to realize the adjustment to light by rotation of liquid crystal molecules in the display device, as shown in FIG. 4, a sealant 5 is disposed on the non-display area 2, and liquid crystal will be disposed in an space which is formed between the sealant 5 and the colour filter substrate and/or the array substrate; and in the non-display area, the alignment layer 3 is separated from the sealant 5. Specifically, in the non-display area 2, the colour filter substrate and the array substrate form a liquid crystal cell through the sealant 5, and the liquid crystal is disposed in the liquid crystal cell; the outer edge of the alignment layer 3 in the display area 1 (i.e., the edge, which is close to the sealant 5, of alignment layer 3 in the display area 1) is disposed within the inner edge of the sealant 5 (i.e., the edge, which is close to the display area 1, of the sealant). That is, it is ensured that the edge of the alignment layer 3 in the display area 1 is separated from the inner edge of sealant 5, so as to prevent the contamination to the liquid crystal, which is caused by the sealant 5 or the matters generated by a combination of the sealant 5 and the alignment layer 3, and hence to prevent the display performance from being affected.

The distance d between the edge of the alignment layer 3 in the display area 1 and the edge of the sealant 5 close to display area 1 (i.e., the distance between the outer edge of the alignment layer 3 in the display area 1 and the inner edge of the sealant 5) is ranged from 40 μm to 60 μm, and preferably, the distance is 50 μm.

The display area 1 can be divided into a plurality of sub-pixel areas. When the display substrate of the present embodiment includes a colour filter substrate, a black matrix BM is provided between the adjacent sub-pixel areas in the colour filter substrate. Further, the black matrix BM is provided in a spacer area SA between the alignment layer 3 in the display area 1 and the sealant 5, that is, the black matrix BM further extends to the area between the outer edge of the alignment layer 3 in the display area 1 and the inner edge of the sealant 5. In this way, although the liquid crystal in the area between the outer edge of the alignment layer 3 in the display area 1 and the inner edge of the sealant 5 may lead to light leakage since the alignment layer 3 is not deposited in this area and thus the liquid crystal molecules may not achieve a good orientation, the display performance will not be affected since the area is very small in size and covered by the black matrix in the colour filter substrate.

Furthermore, in order to realize the driving control to the rotation of the liquid crystal molecules, a thin film transistor (TFT for short) is disposed in the area corresponding to the display area 1, and a bonding pad 4 used for connecting external circuits is disposed in the area corresponding to the non-display area 2 on the array substrate. The TFT and the bonding pad 4 are connected with each other. In order to ensure the binding connection between the bonding pad 4 and external circuits, in a case that the display substrate of the present embodiment includes an array substrate, the outer edge of the alignment layer 3 in the non-display area 2 is separated from the bonging pad 4, so as to keep the alignment layer 3 away from the bonding pad 4. Therefore, a problem that the insulation of the alignment layer 3 breaks the connectivity to the circuits and thus affecting driving performance of the circuits is avoided.

Again, taking the case that the alignment layer 3 in the array substrate extends to the area corresponding to the non-display area 2 as an example, as shown in FIG. 2 and FIG. 4, the outer edge of the alignment layer 3 is separated from the bonding pad 4 to simplify the manufacturing process (the sealant 5 may be configured to connect with one side of the bonding pad 4). In this case, the alignment layer is not disposed in areas outside the bonding pad 4 in a lateral direction to further simplify the manufacturing process. In this case, the area without disposing the alignment layer 3 may cause a negative impact to the rubbing process, but the impact may be ignored due to the small size of this area.

Figure 3:
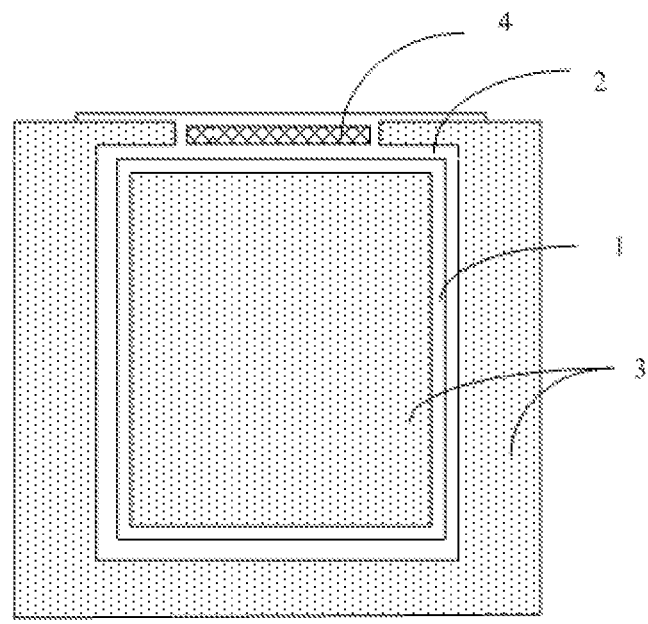
FIG. 3 is a schematic diagram showing another structure of a display substrate according to Embodiment 1 of the present invention.

Of course, as shown in FIG. 3, in the case that the alignment layer 3 in the array substrate is separated from the bonding pad 4 (the sealant 5 may be configured to connect with one side of the bonding pad 4), the alignment layer 3 may further extend into the areas outside the bonding pad 4 in the lateral direction to further reduce the negative impact of the rubbing process caused by the areas outside the bonding pad 4 in the lateral direction. In this case, the alignment layer 3 is disposed in the areas outside the bonding pad 4 in the lateral direction, so the subsequent ET test may not be able to be performed on those areas. However, the lighting test may not be affected.

In actual practices, the arrangement of the alignment layer 3 as shown in FIG. 2 or FIG. 3 may be selected according to rubbing apparatuses, rubbing indexes, or the test requirements to the array substrates, the details thereof will not be redundantly described herein.

It should be understood that the display substrate (including the colour filter substrate or the array substrate) is generally formed on a transparent bare glass (not shown in FIG. 2 to FIG. 4). The display substrate is divided through a cutting process after the colour filter substrate or the array substrate has been manufactured. A part of the alignment layer 3 (as shown in FIG. 2 to FIG. 4), which exceeds the non-display area 2, will be removed in the subsequent cutting process.

In the present embodiment, the alignment layer 3 is made of a polymer material such as polyimide (PI for short). A relief pattern is formed in the alignment layer 3 to anchor the orientation movement of the liquid crystal molecules.

In the present embodiment, the alignment layer 3 is formed by a printing plate transfer method or a spray printing method. In the printing plate transfer method, a corresponding pattern is formed on the areas which are required to be coated with PI on the printing plate, and the other areas which are not required to be coated with PI are blank; in the spray printing method, similar to an ink printer, a spray process is performed on the areas which are specified to be coated with PI. The precision of the alignment layer, which are formed by the above two methods, can achieve a micron order, so it is suitable for mass production of small size display substrates.

Table 1 is a table of performance comparison between a case that the alignment layer is only disposed on the display area and a case that the alignment layer is disposed in both of the display area and the non-display area. In the present embodiment, as shown in Table 1, in a 3.97 inch display substrate, a case that the alignment layer 3 is restricted within the display area 1 is compared with a case that the alignment layer 3 further extends to the non-display area 2 from the display area 1. The experimental results in the case that the alignment layer 3 is disposed in the display area 1 and the non-display area 2 are as follows:

1) there is no imprint on the rubbing cloth after the rubbing process, and there is no particle between the ridges of the wool in micro scale.
2) there is a few or no fixed bright dot particles under 100× eyepiece, and several or no bright dots exist under visual inspection;
3) there is no Mura defect such as surrounding blocks, V blocks, H blocks, and the like.

TABLE 1

| Items | PI coating conditions | Rubbing conditions | Results |
|---|---|---|---|
| Conditions of rubbing cloth after the rubbing process | The alignment layer is disposed in both of the display area and the non-display area | | No imprint on the rubbing cloth, and no particle between the ridges of the wool in micro scale. |
| | The alignment layer is only disposed in the display area | | The rubbing cloth is directly contacted with the area without disposing the alignment layer, the imprints on the rubbing cloth are severe, and there are many viscous particles in micro scale. |
| Defect of foreign matters in the cell | The alignment layer is disposed in both of the display area and the non-display area | Amount of pile impression is 0.3, Number of rubbing times is 100. | a few fixed bright dot particles exist under 100X eyepiece, and several bright dots exist under visual inspection |

TABLE 1-continued

| Items | PI coating conditions | Rubbing conditions | Results |
|---|---|---|---|
| | | Amount of pile impression is 0.4. | several fixed bright dot particles exist under 100X eyepiece, and no bright dot exists under visual inspection |
| | The alignment layer is only disposed in the display area | Mass product condition | many bright dot particles exist under 100X eyepiece, and more than 5 bright dots exist under visual inspection |
| Mura defect | The alignment layer is disposed in both of the display area and the non-display area | | no Mura defect exists, such as surrounding blocks, V blocks, H blocks, and the like. |
| | The alignment layer is only disposed in the display area | | Severe Mura defects such as surrounding blocks, V blocks, H blocks, and the like. |

From the above experimental data, it can be seen that the extending of the alignment layer from the display area to the non-display area may break the limitation that the alignment layer is only disposed on the display area in the prior art. Therefore, the conditions of rubbing cloth may be improved and the Mura defect on the display substrate may be reduced. Furthermore, the disposing of the alignment layer in the non-display area may effectively reduce the defect of bright dot caused by the foreign matters in the cell which is caused by the TFT wirings and the difference of the alignment layer in the array substrate, such that the display performance is significantly improved.

Embodiment 2

The present embodiment provides a mother substrate for display substrates, which includes a plurality of sub-substrates. The sub-substrate is the display substrate according to the embodiment 1.

Figure 5:
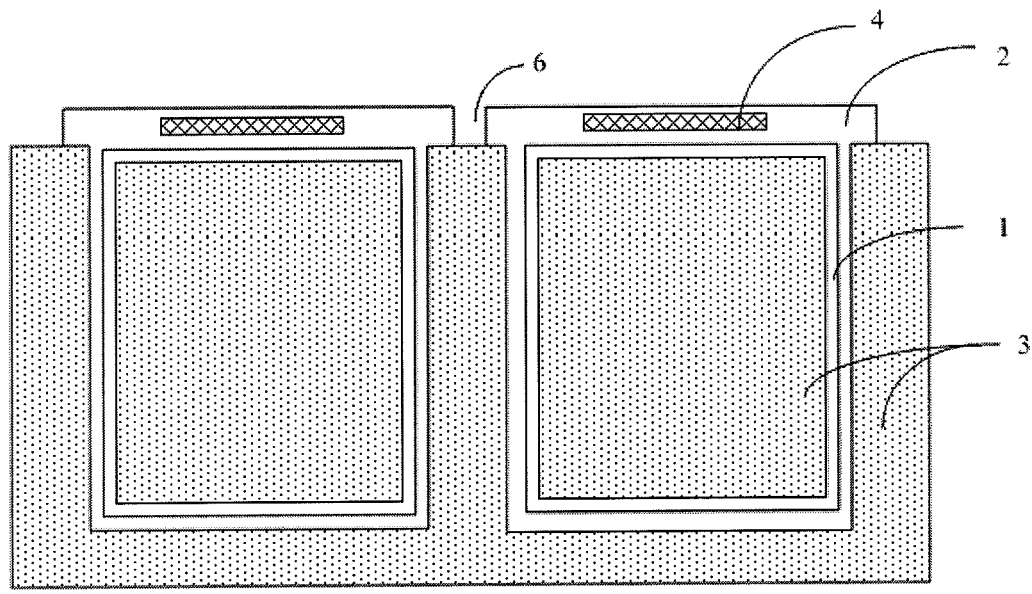
FIG. 5 is a schematic diagram showing a structure of a mother substrate for display substrates according to Embodiment 2 of the present invention.
Figure 6:
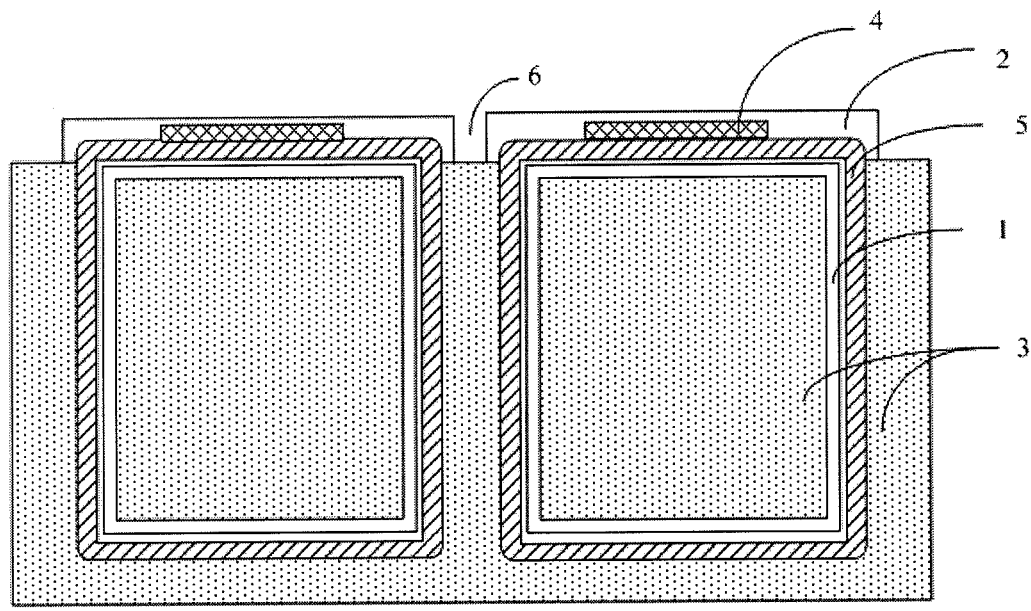
FIG. 6 is a schematic diagram showing a package structure of the mother substrate for display substrates in FIG. 5.

A mother substrate for display substrates, as shown in the FIG. 5, includes two parallel arranged display substrates as shown in the FIG. 2, and a mother substrate for display substrates, as shown in the FIG. 6, includes two parallel arranged display substrates as shown in the FIG. 4. In the mother substrates for display substrates of the present embodiment, a cutting area 6 is formed between the adjacent sub-substrates. Preferably, the alignment layer 3 further extends to the cutting area 6. That is, the pattern of the alignment layer 3 may be disposed across the whole of the glass plate that is used as an array substrate or a colour filter substrate. Of course, the pattern of the alignment layer 3 may correspond to the area of only one single display substrate of the embodiment 1, and it is not limited herein.

The sub-substrate can be formed by a cutting process after the mother substrate is formed, and hence the display device can be formed. The production efficiency and the productivity can be significantly improved by utilization of the mother substrate having a plurality of sub-substrates.

It can be seen that this method, which improves the display performance of the display substrate through an alignment layer, is suitable for a single substrate and the mother substrate having a plurality of substrates. The mother substrate in the present embodiment is very meaningful for the improvement of the yield of production and the quality of products of the small size display substrate.

Embodiment 3

The present embodiment provides a display device including a display substrate, wherein the display substrate is the display substrate according to the Embodiment 1. Wherein, the display substrate includes an array substrate and/or a colour filter substrate.

Wherein, the display device may be any product or part that has a display function, such as a liquid crystal display panel, a mobile phone, a tablet computer, a television, a display, a laptop computer, a digital frame, a navigator, and the like.

With the display substrate according to Embodiment 1, in the present embodiment, the display performance of the display device may be further improved, and a better display performance may be achieved.

In the display substrate according to the present invention, by providing the same pattern of alignment layer in both of the non-display area and the display area of the display substrate, the Mura defect caused by the difference of surface roughness between the display area and the non-display area of the display substrate may be significantly reduced, and a large amount of small foreign matters gathered due to the rubbing between the rubbing cloth and metal residuals may also be significantly reduced. The purpose of reducing the foreign matter in the cell is achieved, and therefore the yield of production and the quality of products may be improved.

It should be understood that, the above embodiments are merely exemplary embodiments for the purpose of explaining the principle of the present invention, and the present invention is not limited thereto. For a person skilled in the art, various improvements and modifications may be made to the present invention without departing from the spirit and essence of the present invention. These improvements and modifications are also deemed as the protection scope of the present invention.

What is claimed is:

1. A display substrate, which comprising a display area and a non-display area surrounding the display area, wherein an alignment layer is disposed in the display area and the non-display area;
   wherein a sealant is disposed in the non-display area, the alignment layer in the display area is separated from the sealant; and
   wherein the display substrate is an array substrate, a bonding pad used for connecting external circuits is disposed in the non-display area on the array substrate, the alignment layer in the non-display area is separated from the bonding pad.

2. The display substrate according to claim 1, wherein the alignment layer is formed by a printing plate transfer method or a spray printing method.

3. A mother substrate for display substrates, including a plurality of sub-substrates, wherein the sub-substrate is the display substrate according to claim 1.

4. The mother substrate for display substrates according to claim 3, wherein a cutting area is formed between the adjacent sub-substrates, the alignment layer further extends to the cutting area.

5. A display device, including a display substrate, wherein the display substrate is the display substrate according to claim 1.

6. The display device according to claim 5, wherein the display substrate includes an array substrate and/or a color filter substrate.

7. The display substrate according to claim 1, wherein the alignment layer is made of a polymer material.

8. The display substrate according to claim 1, wherein a distance between an edge of the alignment layer in the display area and an edge, which is close to the display area, of the sealant is ranged from 40 µm to 60 µm.

9. The display substrate according to claim 8, wherein the alignment layer is formed by a printing plate transfer method or a spray printing method.

10. The display substrate according to claim 8, wherein the alignment layer is made of a polymer material.

11. The display substrate according to claim 1, wherein the display substrate is a color filter substrate, the display area is divided into a plurality of sub-pixel areas, a black matrix is provided between the adjacent sub-pixel areas in the colour filter substrate, and the black matrix is also provided in a spacer area between the alignment layer in the display area and the sealant.

12. The display substrate according to claim 11, wherein the alignment layer is formed by a printing plate transfer method or a spray printing method.

13. The display substrate according to claim 11, wherein the alignment layer is made of a polymer material.

* * * * *